United States Patent
Major et al.

(10) Patent No.: US 10,833,552 B2
(45) Date of Patent: Nov. 10, 2020

(54) MOTOR LEAD CONNECTOR FOR INGRESS PROTECTED MOTOR

(71) Applicant: Nidec Motor Corporation, St. Louis, MO (US)

(72) Inventors: Michael W. Major, Moro, IL (US); Richard A. Belley, Hillsboro, MO (US); Marc J. Corcoran, St. Charles, MO (US)

(73) Assignee: Nidec Motor Corporation, St. Louis, MO (US)

( * ) Notice: Subject to any disclaimer, the term of this patent is extended or adjusted under 35 U.S.C. 154(b) by 241 days.

(21) Appl. No.: 16/006,527

(22) Filed: Jun. 12, 2018

(65) Prior Publication Data

US 2018/0358860 A1    Dec. 13, 2018

Related U.S. Application Data

(60) Provisional application No. 62/518,370, filed on Jun. 12, 2017.

(51) Int. Cl.
| | |
|---|---|
| *H02K 5/10* | (2006.01) |
| *H01R 13/621* | (2006.01) |
| *H01R 13/631* | (2006.01) |
| *H02K 11/33* | (2016.01) |
| *H01R 13/52* | (2006.01) |
| *H01R 12/71* | (2011.01) |
| *H02K 5/18* | (2006.01) |
| *H01R 105/00* | (2006.01) |
| *H02K 5/22* | (2006.01) |

(52) U.S. Cl.
CPC .......... *H02K 5/10* (2013.01); *H01R 13/6215* (2013.01); *H01R 13/631* (2013.01); *H02K 11/33* (2016.01); *H01R 12/718* (2013.01); *H01R 13/5202* (2013.01); *H01R 13/5219* (2013.01); *H01R 2105/00* (2013.01); *H01R 2201/10* (2013.01); *H02K 5/18* (2013.01); *H02K 5/225* (2013.01)

(58) Field of Classification Search
CPC ............. H01R 13/5219; H01R 12/718; H01R 13/6215; H01R 13/631; H01R 13/5202; H01R 2105/00; H01R 2201/10; H02K 5/225; H02K 5/10
See application file for complete search history.

(56) References Cited

U.S. PATENT DOCUMENTS

2010/0289354 A1 *  11/2010  Ishizue .............. H02K 5/08
                                                          310/71
2018/0019544 A1 *  1/2018  Ishibashi ............. H02K 5/22

* cited by examiner

*Primary Examiner* — Jue Zhang
(74) *Attorney, Agent, or Firm* — Hovey Williams LLP

(57) ABSTRACT

An electric motor having a rotor, a stator, a case at least partially enclosing the rotor and the stator, and a lead connector. The lead connector includes a body having a base, a terminal end, and an intermediate portion extending between the base and the terminal end. The lead connector also includes a first sealing interface extending substantially circumferentially about the intermediate portion and a second sealing interface abutting the case.

20 Claims, 15 Drawing Sheets

MOTOR LEAD CONNECTOR FOR INGRESS PROTECTED MOTOR

CROSS-REFERENCE TO RELATED APPLICATION

The present application claims the benefit of and priority from identically-titled U.S. Provisional Patent Application Ser. No. 62/518,370, filed Jun. 12, 2017, the entire disclosure of which is hereby incorporated by reference herein.

BACKGROUND OF THE INVENTION

Field of the Invention

The present invention relates generally to motors. More specifically, the present invention concerns a lead connector for a motor that is particularly configured to enhance the ingress protection of the motor.

Discussion of the Prior Art

Those of ordinary skill in the art will appreciate that electric motors typically include a controller that governs parameters of how the motor operates (for example, speed and direction). The motor controller may be programmable, which can allow a motor with a given construction to be programmed to operate in a certain desirable manner, as may be particularly advantageous when the motor is coupled with a driven machine. In this way, a number of motors, which otherwise may be physically alike, can each operate differently based on the settings of the programmable controller.

As will also be readily appreciated, a conventional motor will often include one or more openings in a motor case through which power lead wiring passes from inside the motor chamber to connect to the controller. The lead wiring may be housed within a molded connector serving as the interface for coupling to the controller. Such a conventional molded connector may extend from a position inside the motor control case, through an opening in the case, and to the connection point with the controller.

Conventional molded connectors often interfere with cooling along the surface of the motor case, require extensive alignment operations between the connector and the controller, require an array of additional components for achieving a proper seal, and/or may lead to permanent connections that are difficult—if not impossible to replace. There is a need for an improved lead connector for addressing one or more of the aforementioned deficiencies.

SUMMARY

According to one aspect of the present invention, an electric motor is provided. The motor has a rotor, a stator, a case at least partially enclosing the rotor and the stator, and a lead connector. The lead connector includes a body having a base, a terminal end, and an intermediate portion extending between the base and the terminal end. The lead connector also includes a first sealing interface extending substantially circumferentially about the intermediate portion and a second sealing interface abutting the case.

According to another aspect of the present invention, a lead connector is provided. The lead connector includes a body having a base, a terminal end, and an intermediate portion extending between the base and the terminal end. The lead connector also includes a first sealing interface extending substantially circumferentially about the intermediate portion and a gasket configured to form a second sealing interface between the base and the electric motor.

According to yet another aspect of the present invention, a lead connector is provided. The lead connector includes a body having a base, a terminal end, and an intermediate portion extending between the base and the terminal end. The intermediate portion tapers away from the base. The lead connector also includes a sealing interface extending substantially circumferentially about the intermediate portion. The base is configured for securement to the electric motor.

This summary is provided to introduce a selection of concepts in a simplified form that are further described below in the detailed description of the preferred embodiments. This summary is not intended to identify key features or essential features of the claimed subject matter, nor is it intended to be used to limit the scope of the claimed subject matter.

Various other aspects and advantages of the present invention will be apparent from the following detailed description of the preferred embodiments and the accompanying drawing figures.

BRIEF DESCRIPTION OF THE DRAWING FIGURES

Preferred embodiments of the present invention are described in detail below with reference to the attached drawing figures, wherein.

Figure 13:
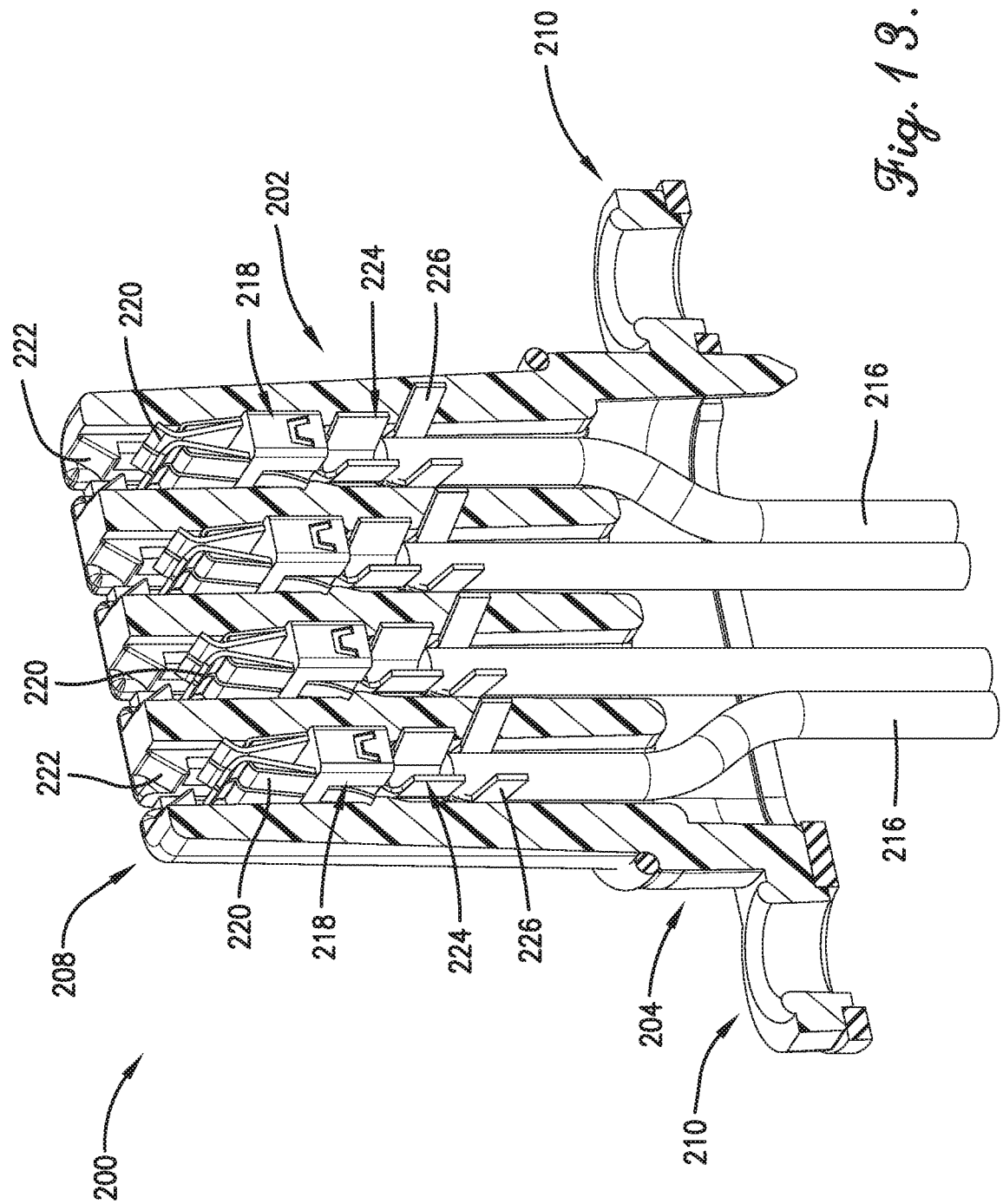
FIG. 13 is an enlarged sectional view of a lead connector for at least partly housing four wires, according to a second embodiment of the present invention.
Figure 14:
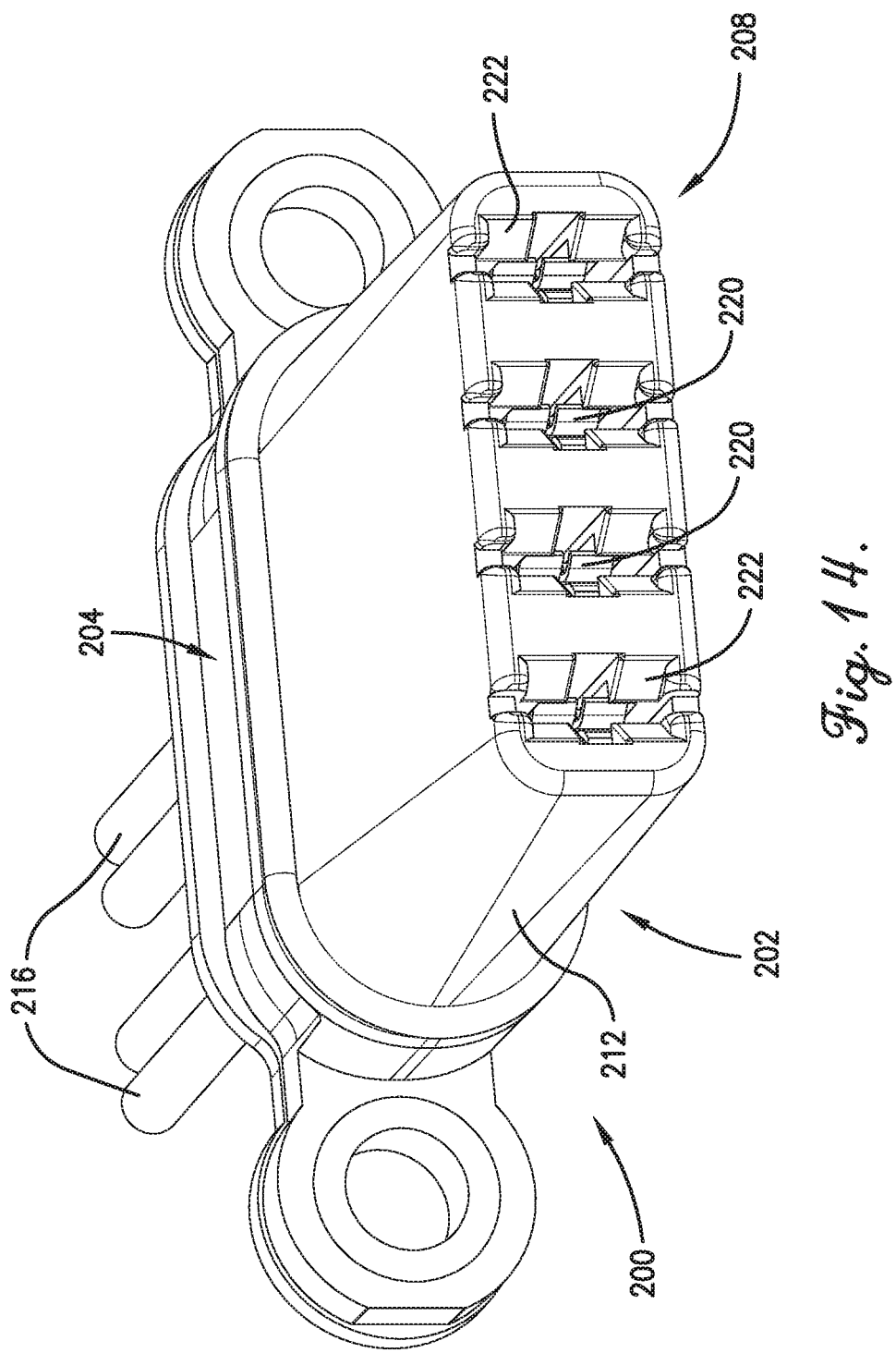
Figure 15:
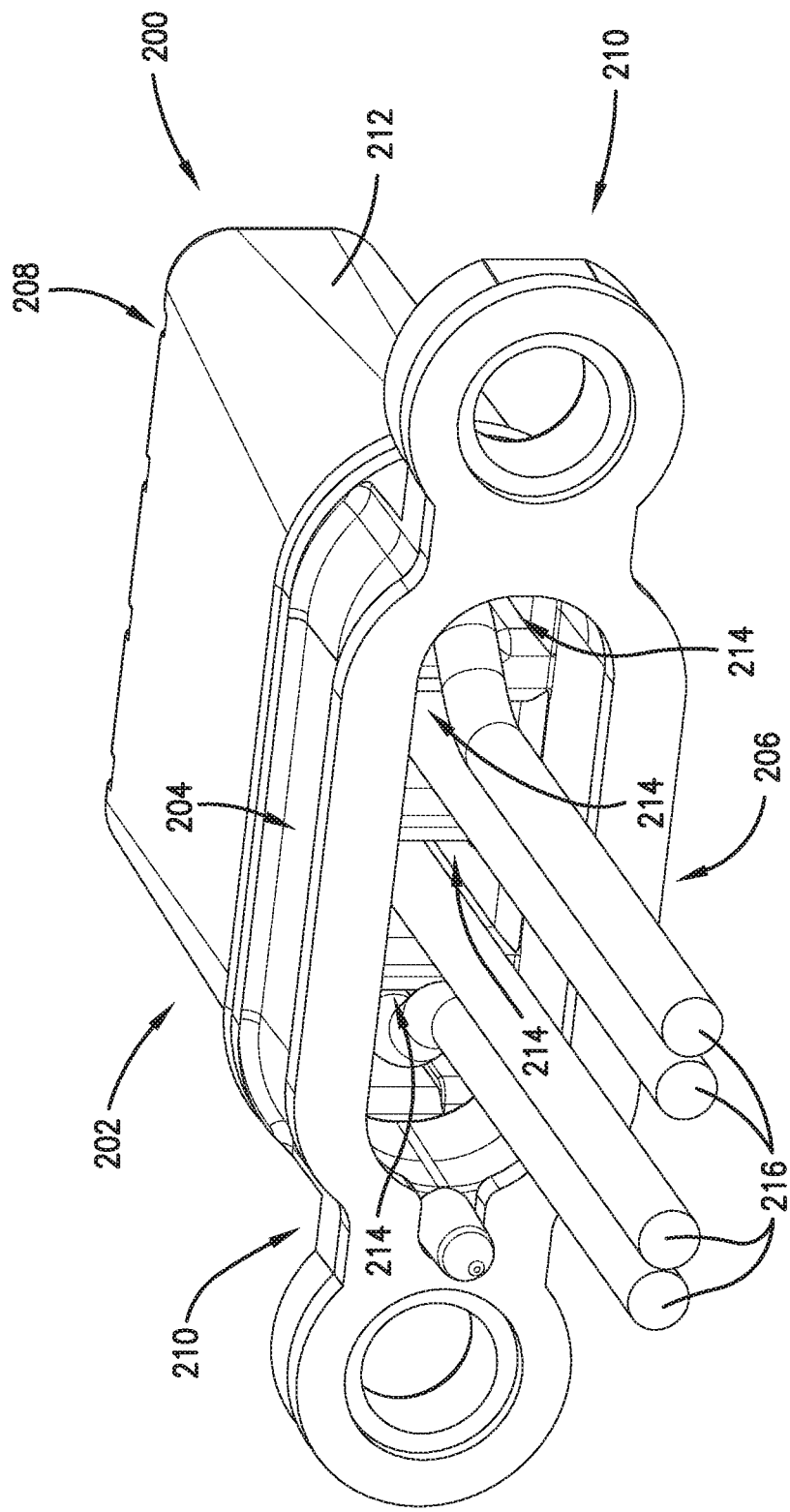

FIG. 14 is an enlarged isometric view of the lead connector of FIG. 13 taken from a vantage point proximate a terminal end of the lead connector that houses a plurality of terminal connecting assemblies; and FIG. 15 is an enlarged isometric view of the lead connector of FIG. 13, showing an interface presented by a gasket for mounting against the flat face of the motor case as well as motor lead wires extending through mounting holes defined within an intermediate portion of the connector body.

While the drawings do not necessarily provide exact dimensions or tolerances for the illustrated components or structures, the drawings, not including any purely schematic drawings, are to scale with respect to the relationships between the components of the structures illustrated therein.

DETAILED DESCRIPTION OF THE PREFERRED EMBODIMENTS

The present invention is susceptible of embodiment in many different forms. While the drawings illustrate, and the specification describes, certain preferred embodiments of the invention, it is to be understood that such disclosure is by way of example only. There is no intent to limit the principles of the present invention to the particular disclosed embodiments.

With initial reference to FIGS. 1-5, a motor assembly 18 includes a lead connector 20 (see FIG. 4) constructed in accordance with an embodiment of the present invention. The lead connector 20 is configured for attachment to an electric motor 22 and for sealing against the electric motor 22 and a controller housing 24. The lead connector 20 provides electrical connection between components in the motor 22 and in the controller housing 24.

Figure 3:
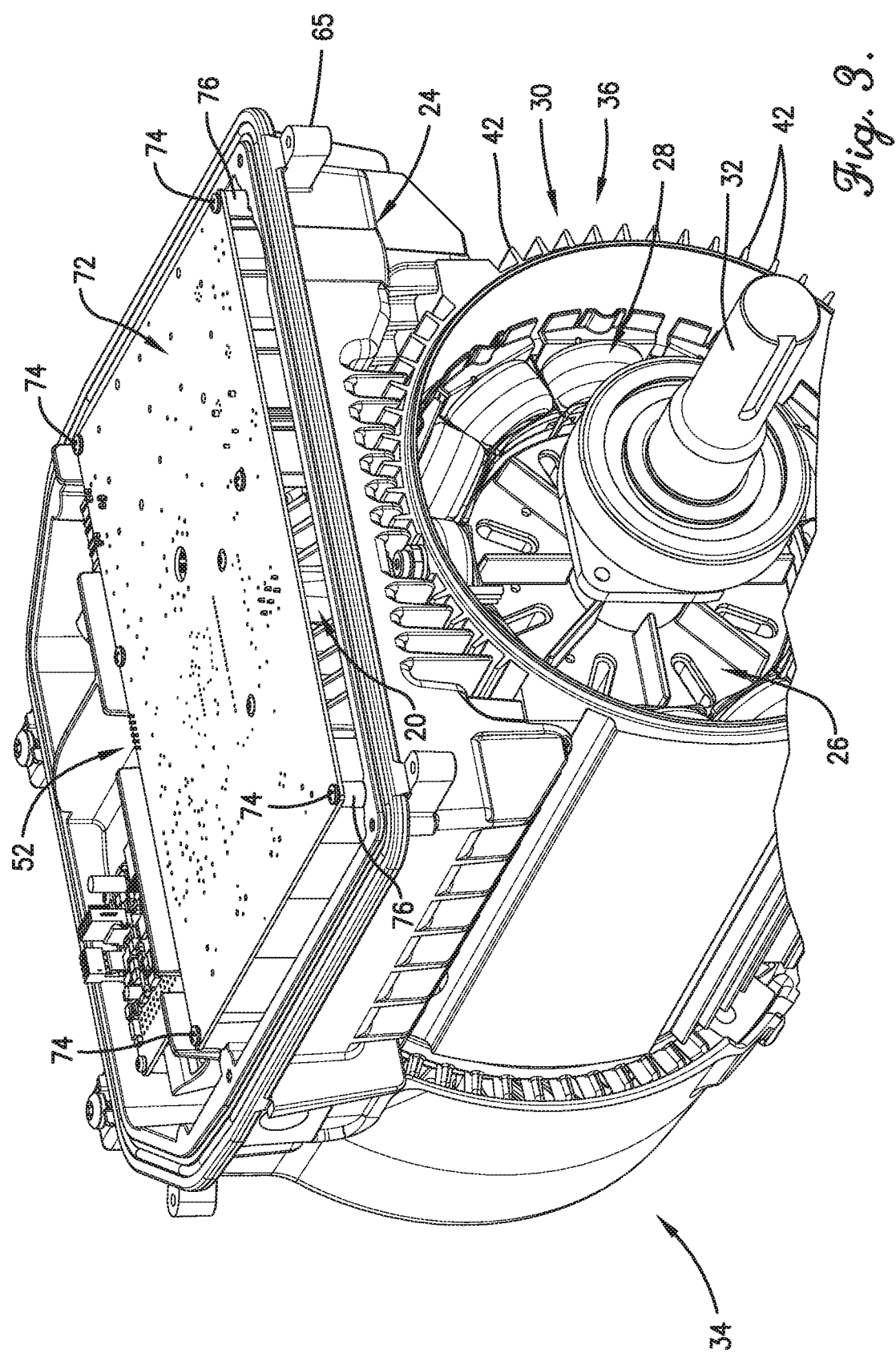
FIG. 3 is an enlarged, fragmentary, isometric view of the motor of FIG. 2, with a cover of the controller housing being removed to show an electronics compartment and circuit board.

As is generally customary, the motor 22 broadly includes a rotor assembly 26, rotatable about an axis, and a stator assembly 28. The rotor assembly 26 and the stator assembly 28 are both at least substantially contained within an internal motor chamber that is defined by a motor case 30. As shown in FIG. 3, the rotor assembly 26 includes an axially disposed shaft 32 that projects outwardly from one end of the motor case 30.

The preferred motor case 30 is generally cylindrical and presents opposite axial margins 34, 36. The motor case 30 comprises a shell element 38 and endbells 40 disposed adjacent each of the axial margins 34, 36 and secured to the shell element 38 with bolts. Cooling fins 42 extend axially along an outer surface of shell element 38. Motor 22 also includes outwardly extending supporting feet 44.

Generally speaking, except with respect to the structure described and taught herein for and/or relating to electrically communicating with lead wires of the motor 22, the structure and operation of the motor 22 is generally conventional in nature, as will be readily appreciated by one of ordinary skill in the art, and need not be described in further detail here. Furthermore, such conventional aspects of the motor design may be varied without departing from the scope of the present invention.

Figure 2:
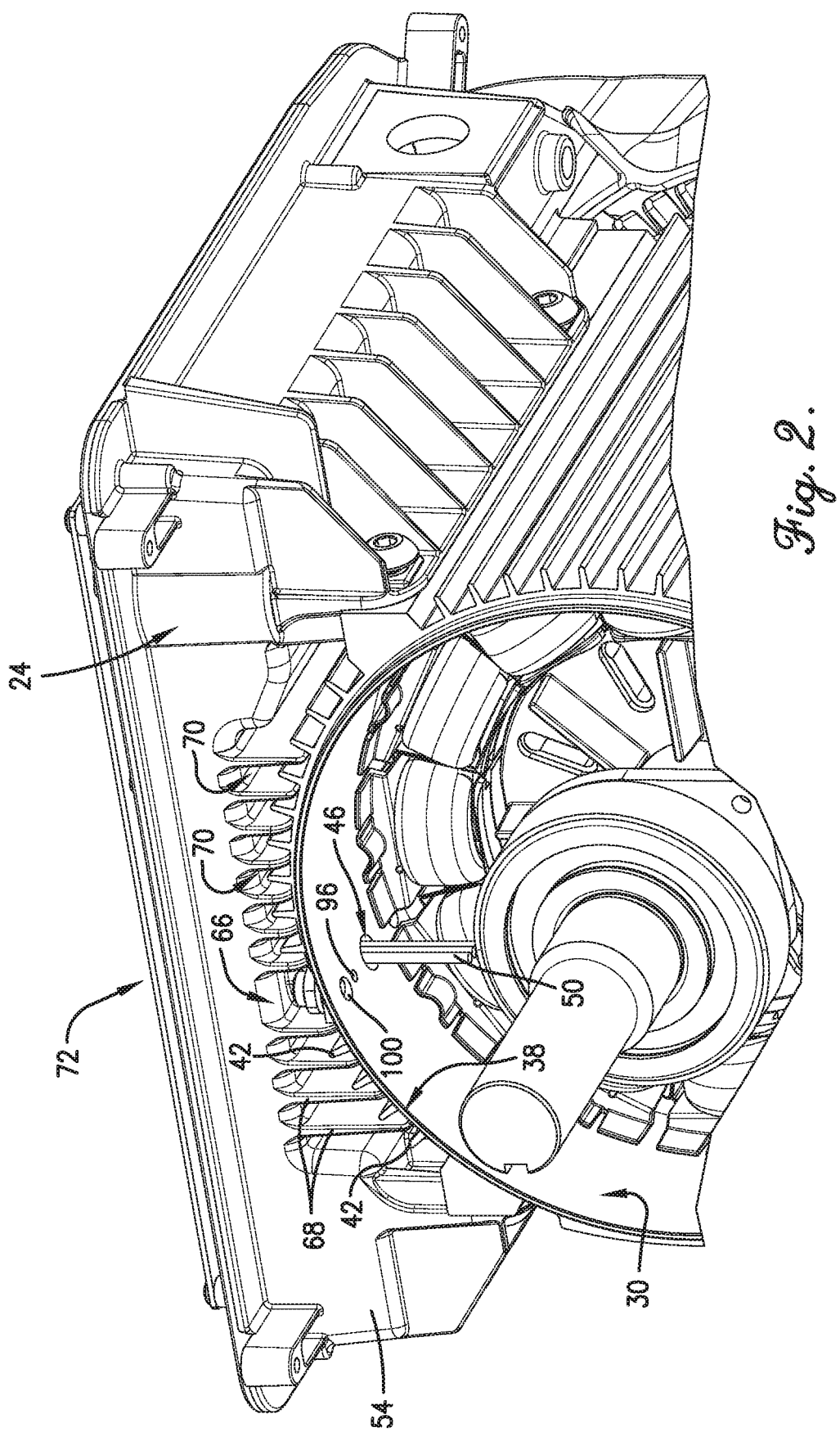
FIG. 2 is an enlarged, fragmentary, isometric view of the motor of FIG. 1 with an endbell being removed to show part of a motor compartment, a wire opening defined by a motor case, and lead wires extending through the opening.

As shown particularly in FIG. 2 a power-supply opening 46 of the motor 22 is defined in the motor case 30. The opening 46 provides a passage for electrical connection with a plurality of motor terminals 48 (see FIG. 9). The terminals 48 are preferably formed by the ends of respective phase winding wires 50. In the preferred embodiment, three (3) wires 50 are used, each corresponding to a phase of a three-phase alternating current electric motor. It is noted that the particular shape of the opening 46 depicted herein is provided by way of example only, as the opening 46 could alternatively take many other shapes without departing from the teachings of the present invention. Moreover, one of ordinary skill in the art will readily understand that the opening 46 could alternatively be disposed elsewhere along the motor case 30. Still further, one of ordinary skill in the art will also readily understand that the terminals 48 may number more or fewer than three (3), and that a corresponding increase or decrease in the number of associated components—such as prongs, wiper contacts, wires, socket entry surfaces, and electrical connectors—may be made without departing from the spirit of the present invention, as described in more detail below.

Figure 1:
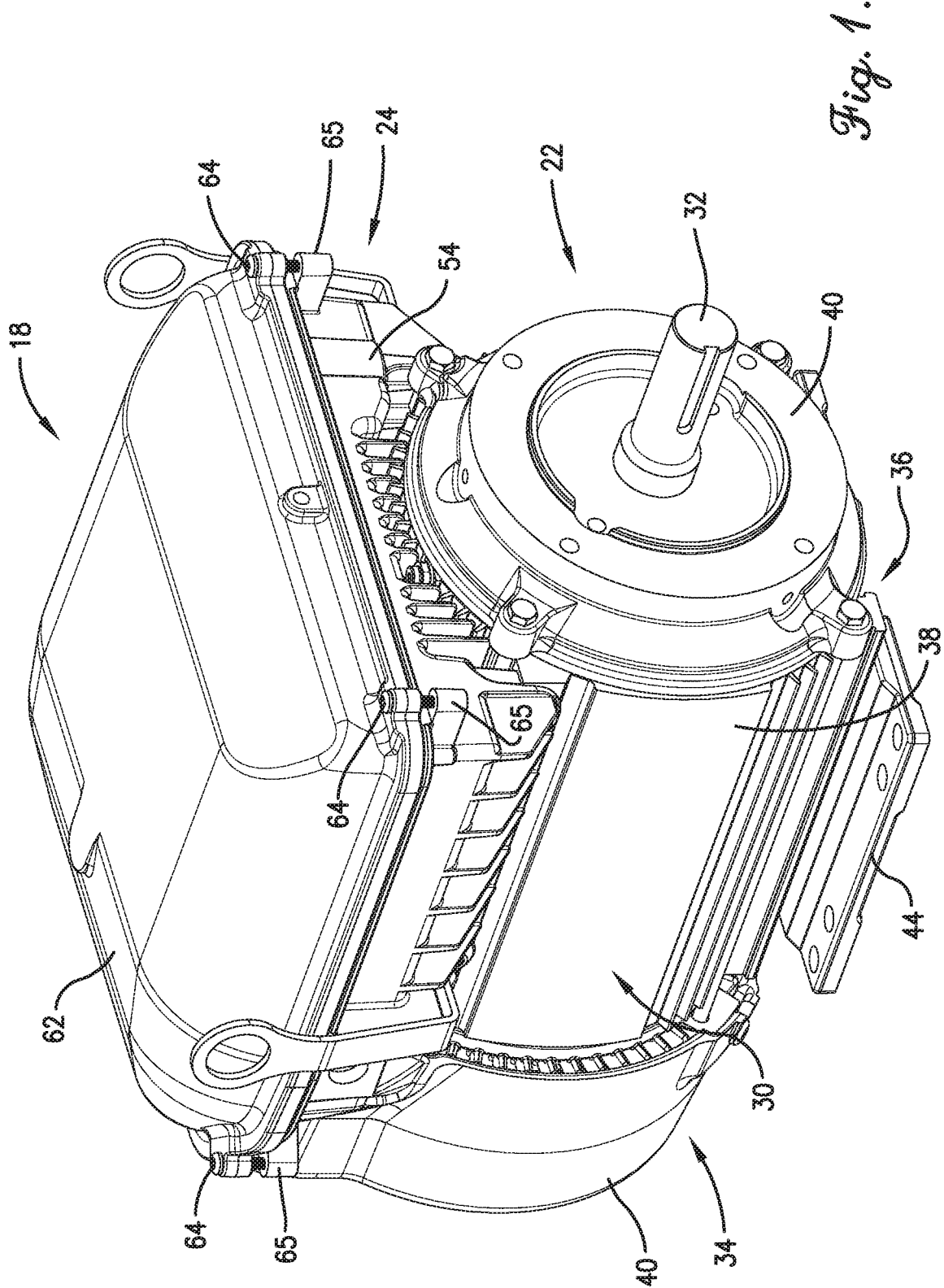
FIG. 1 is an isometric view of a motor with attached controller housing.
Figure 5:
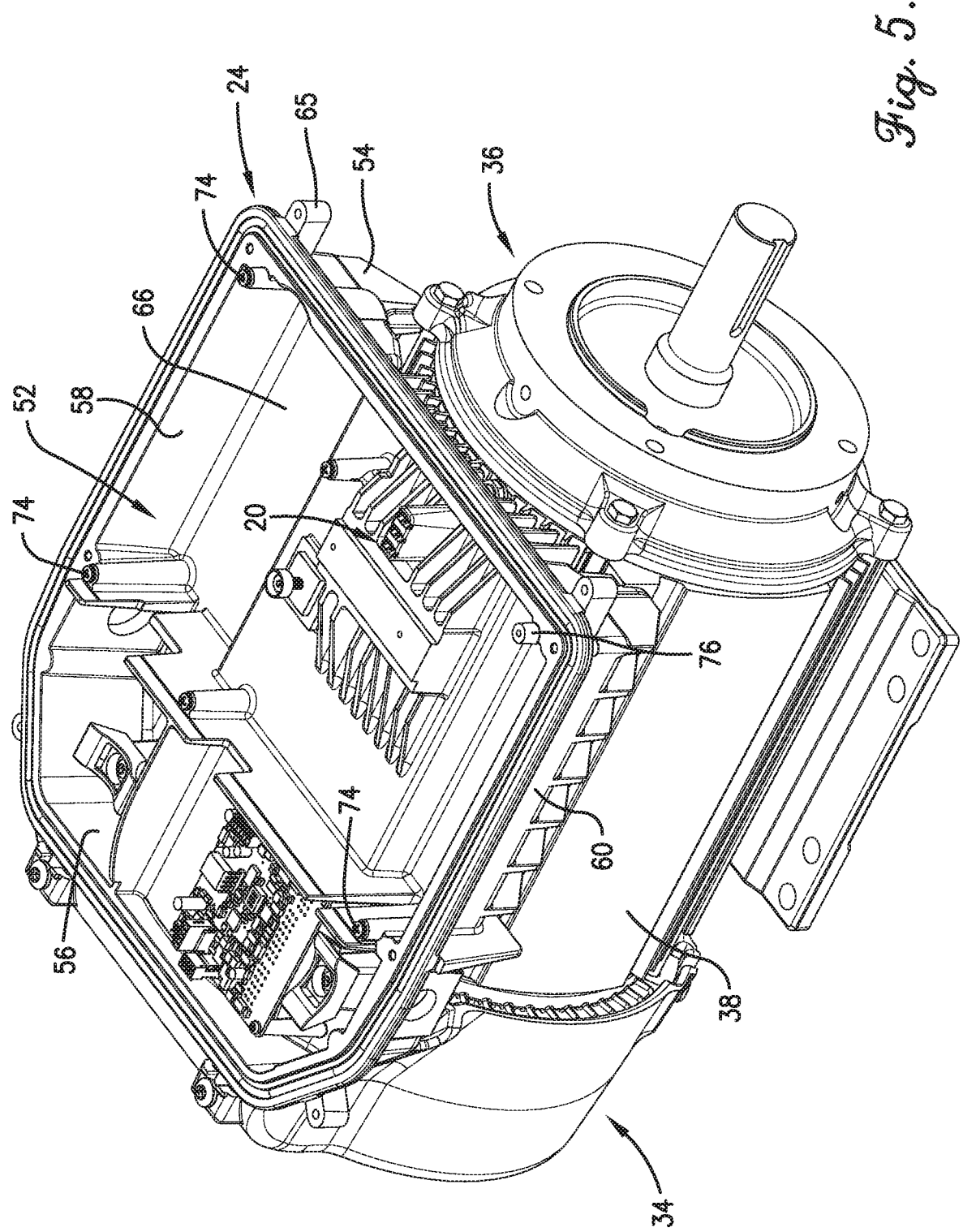
FIG. 5 is an enlarged, fragmentary, isometric view of the motor and controller housing of FIG. 2, similar in many respects to the view of FIG. 3, but with the circuit board being removed to better show extension of the lead connector into the electronics compartment.

Turning to FIGS. 1, 3 and 5, controller housing 24 defines an at least substantially, and preferably fully, enclosed electronics compartment 52 positioned radially outside the motor shell 38. The controller housing 24 is preferably positioned between the first and second axial margins 34, 36, which permits the motor 22 to be installed in spaces having only a small axial envelope and allows unobstructed access to the shaft 32. Alternative controller housing locations are permissible, but at least some degree of axial overlap between the controller housing 24 and the motor 22 is desirable to facilitate use of the connector described herein.

Controller housing 24 preferably includes a front wall 54, a rear wall 56, and a pair of side walls 58 and 60. The controller housing 24 preferably also includes a lid or cover 62 that is securable to the front and rear walls 54, 56 via screws 64 threaded through bosses 65, and/or via other suitable fasteners. Yet further, the controller housing 24 preferably includes a bottom wall 66 that is preferably curved and overlies a curved surface of the shell 38. Turning briefly to FIG. 2, the bottom wall 66 and curved surface of shell 38 preferably present margins having at least substantially similar radiuses of curvature. Most preferably, the arcuate, complementary margins of each of the bottom wall 66 and the shell 38 is formed at the tips of a plurality of spaced projections. More particularly, the illustrated motor 22 includes cooling fins 42 alternating radially with fins 68 of bottom wall 66, thereby defining cooling channels 70 extending axially along shell 38 for enhanced cooling.

Preferably, the controller housing 24 is at least substantially continuous, forming a complete enclosure for the electronics compartment 52 such that ingress of contaminants therethrough is restricted or prevented. In a preferred embodiment, the controller housing 24 is substantially solid and comprises plastic. It is permissible according to some aspects of the present invention, however, for another suitable material or materials (for example, steel or aluminum) to be used.

Figure 6:
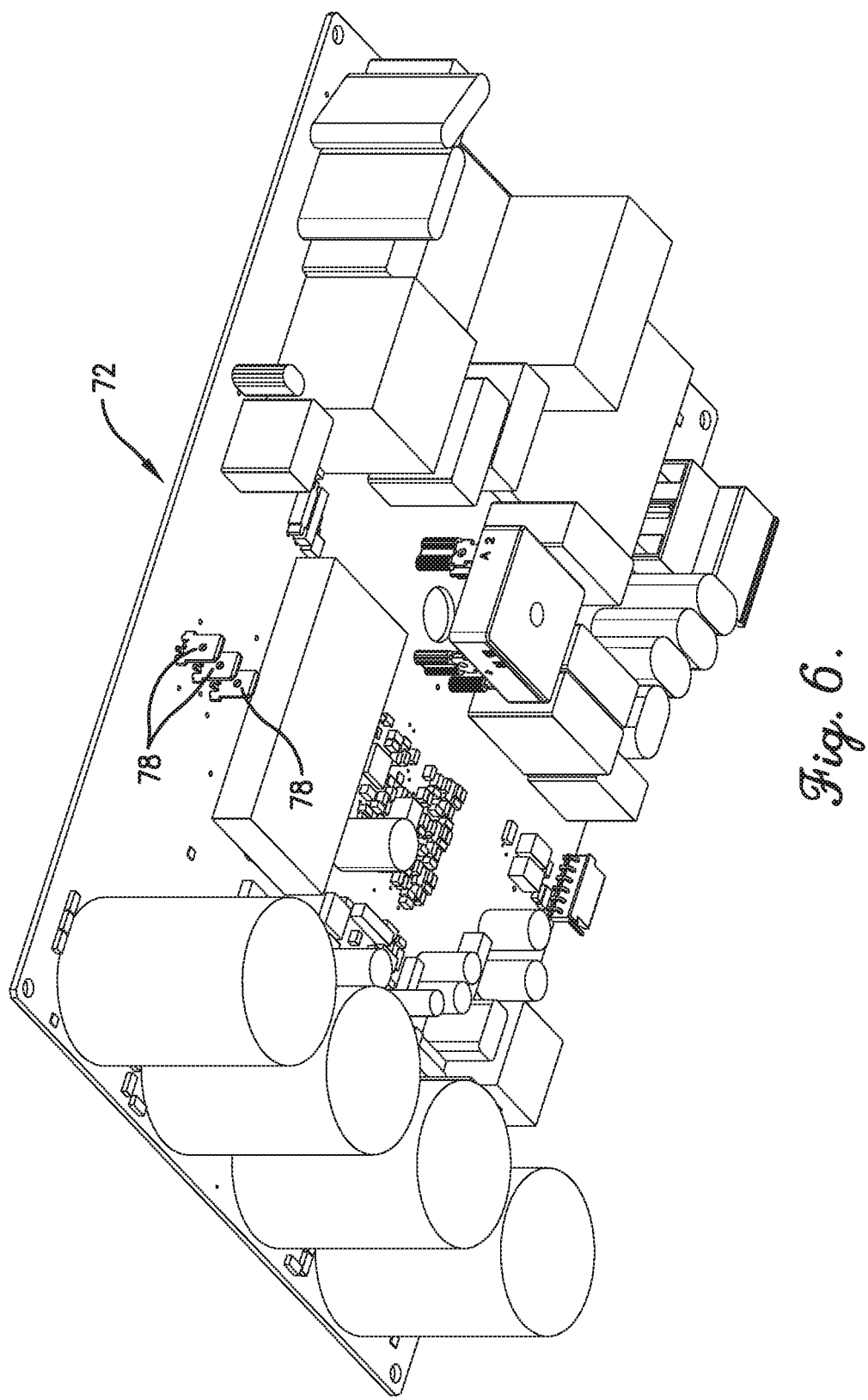
FIG. 6 is an enlarged isometric view of the circuit board of FIG. 3, showing prongs for electrical communication with the lead wires of the motor via the lead connector.
Figure 9:
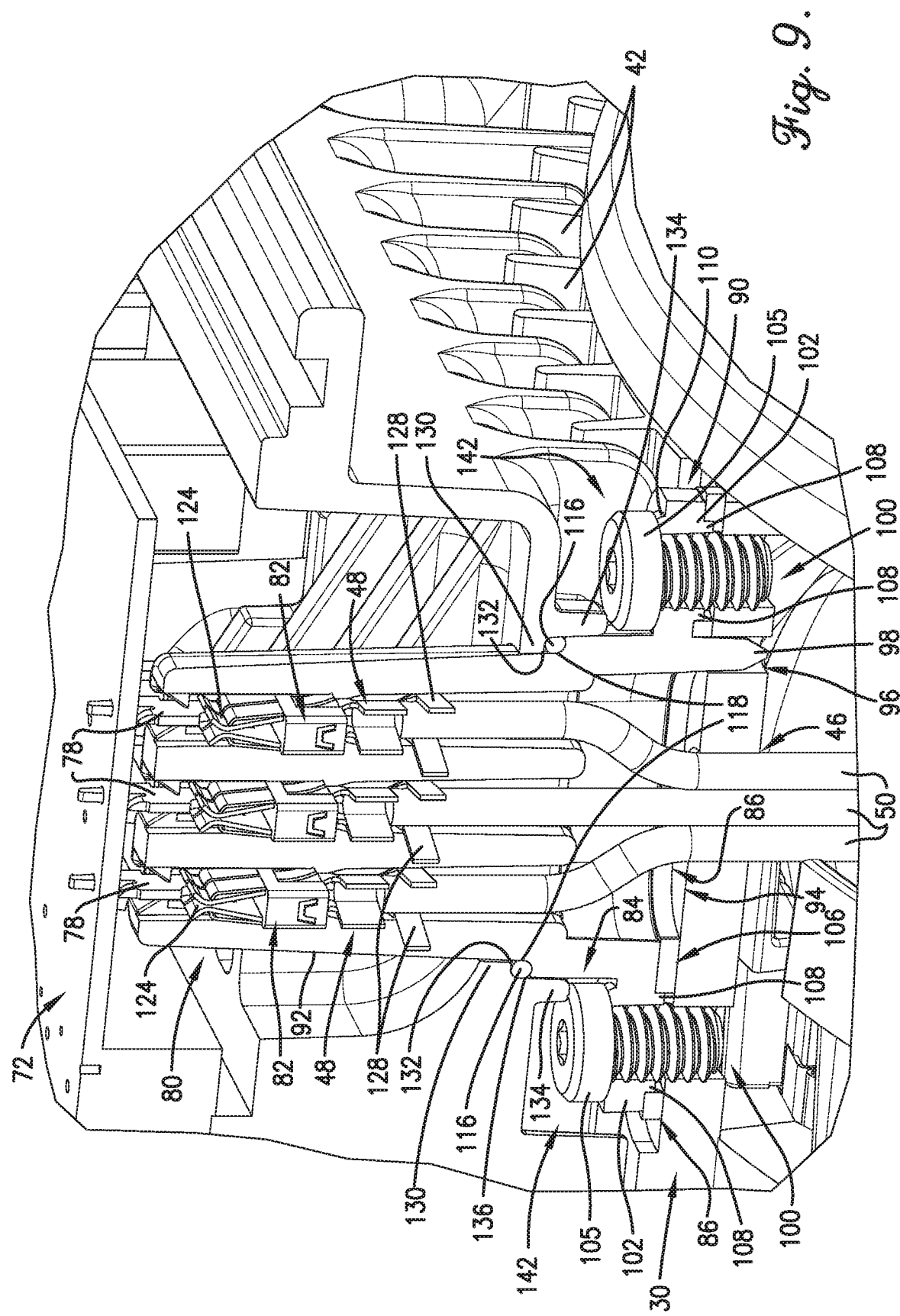
FIG. 9 is an enlarged, fragmentary, partial cutaway, sectional view of the motor of FIG. 1, showing the lead connector fixed to the motor case, the controller housing sitting flush and substantially sealed against the lead connector, and the lead connector in electrical contact with prongs of the circuit board.

Turning to FIGS. 3 and 6, motor circuitry for controlling operation of the motor 22 includes a programmable controller, preferably comprising board 72 and a plurality of other electronics components disposed within controller housing 24. Board 72 is preferably a printed circuit board and is mounted within the electronics compartment 52 using screws 74 threaded into bosses 76. The programmable controller is operable to control operational characteristics of the motor 22 (for example, speed), and is electrically connected to at least some of the motor terminals 48. Turning briefly now to FIG. 9, board 72 is electrically connected to prongs 78, which extend into a connector body 80 (described below) and are electrically connected to a plurality of terminal connecting assemblies 82 (also described below).

Turning now more generally to FIGS. 7-12, the lead connector 20 includes connector body 80. Connector body 80 includes a base 84 presenting an interface 86 that generally matingly corresponds with and overlies the opening 46 of the motor 22. The connector body 80 generally tapers as it extends away from the base 84 and terminates in a terminal end 88. In more detail regarding the illustrated embodiment, the connector body 80 includes a flange 90 extending outwardly to form a skirt of the connector 20 substantially opposite the terminal end 88. Between the base 84 and the terminal end 88 is an intermediate portion 92 of the connector body 80.

Figure 4:
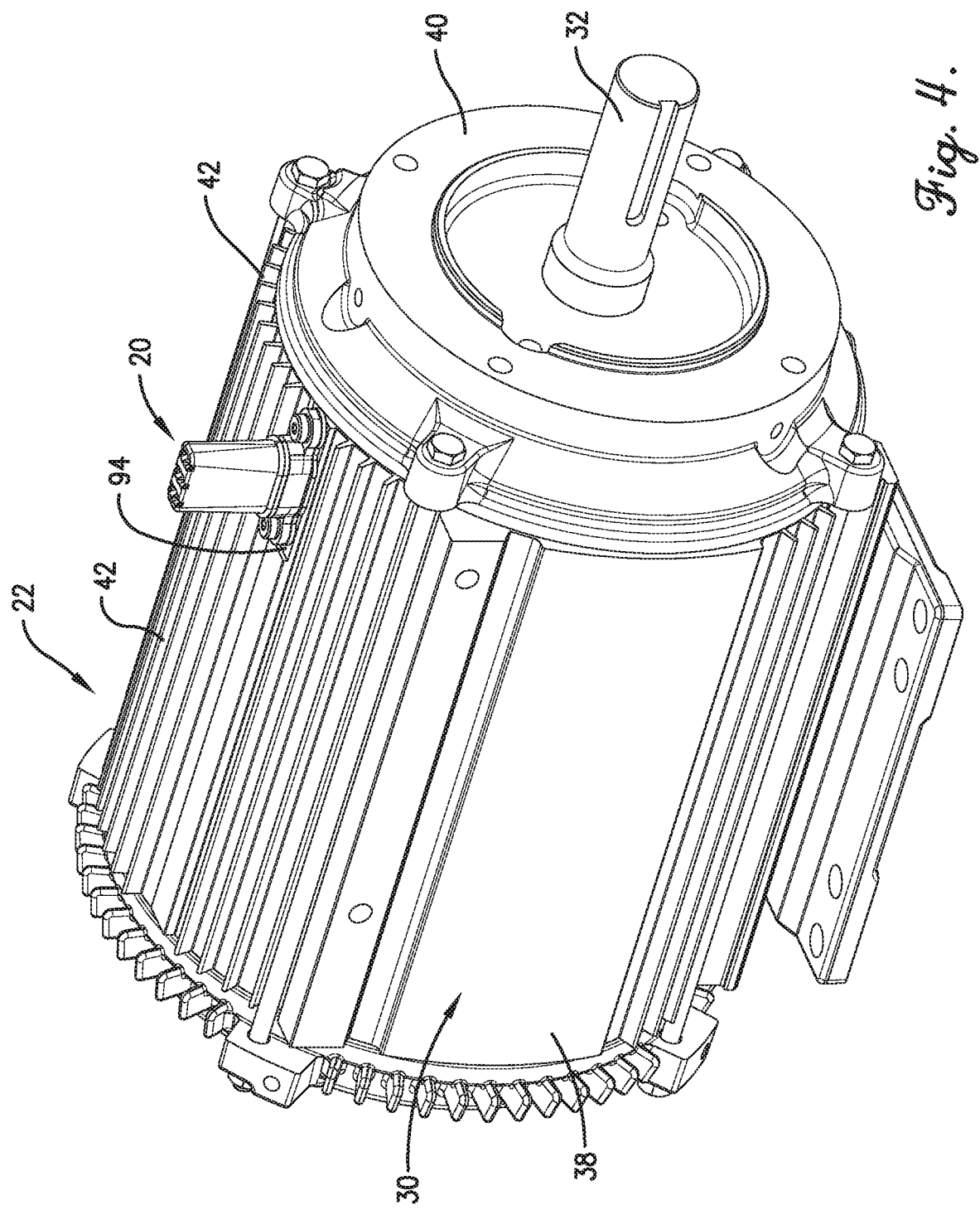
FIG. 4 is an isometric view of the motor of FIG. 1 with the controller housing being removed to show the lead connector fixed in a substantially covering relationship over a face of the motor case.

FIGS. 4 and 9 illustrate a face 94 of the motor case 30 substantially surrounding opening 46. As will be described, the face 94 and underside of interface 86 preferably have complementary shapes to facilitate sealing engagement therebetween. In the illustrated embodiment, the face 94 and flange 90 are substantially flat and/or have a modest curvature corresponding broadly to the cylindrical shape of the shell 38; however, for some aspects of the present invention, the face 94 and flange 90 can have a different complementary shape (for example, polygonal, curved and/or curvilinear), as long as a sealed interface between the two is achievable. The illustrated motor case 30 also defines an alignment hole 96 (see FIGS. 9 and 11) therethrough that extends from the face 94 and is disposed in the general vicinity of the opening 46. The hole 96 receives a pointed, tapered projection 98 extending from base 84 opposite the terminal end 88. The case 30 still further includes a plurality of threaded bolt-receiving holes 100 defined therein and disposed around the opening 46. (See FIG. 11 (threading not shown))

The flange 90 of the base 84 of lead connector 20 includes wings 102. Each wing 102 presents a hole 104 (see FIGS. 8 and 10) therein that aligns with the corresponding bolt-receiving hole 100 of the motor case 30 to facilitate securement thereto. Generally speaking, assembly of the lead connector 20 to motor case 30 preferably includes aligning projection 98 with alignment hole 96, aligning the holes 104 of the flange 90 with the threaded bolt-receiving holes 100, and securing the lead connector 20 to motor case 30 using fasteners 105. Controller housing 24 may then be aligned and secured to motor case 30 over lead connector 20, as described elsewhere herein.

The illustrated interface 86 is formed at least in part by a gasket 106 of the connector 20. The gasket 106 is disposed between the connector body 80 and the face 94 of the motor case 30 in an assembled configuration. The gasket 106 is preferably, although not necessarily, made of a compressible and resilient material, such as rubber or the like. The seal provided by the gasket 106 against the motor case 30 at the interface 86 restricts or prevents seepage of dust and/or moisture from the outside of the motor case 30 into the inside of the motor chamber through the outer periphery of the opening 46. The sealing out of dust and/or moisture from the inside of the motor chamber prevents damage to the electrical elements of the motor 22 in dirty, moist and/or wet operating conditions. It is foreseen that adhesive may be coated on one or both sides of gasket 106 to enhance sealing and/or ease of assembly. It is also foreseen that a sealing interface may be achieved other than with a gasket—for example where a motor case and connector base are machined to fit tightly against one another—without departing from the spirit of the present invention.

The preferred flange 90 also includes a rib 108 circumscribing each hole 104. Ribs 108 are preferably inset at least partially through the thickness of gasket 106 at the bottom rims circumscribing the holes 104. Ribs 108 provide a stopping surface to substantially prevent extrusion of the gasket 106 into the path of fasteners 105 extending through the holes 104, particularly where pressure exerted by fasteners 105 urge the gasket 106 to expand across the face 94. In addition, flange 90 preferably includes ridges 110 (see FIG. 10) formed along the top rim portion circumscribing each hole 104. Ridges 110 substantially form a seal between a bottom surface of the heads of fasteners 105 and a top surface of wings 102 of the flange 90. It is foreseen that ridges 110 may be formed by self-sealing coatings, gaskets or similar compressible substances without departing from the spirit of the present inventive concept.

The lead connector 20 includes a substantially continuous sealing interface 112 extending circumferentially about the intermediate portion 92. The sealing interface 112 includes a shoulder 114 formed by the body 80 and a gasket 116, each of which extends circumferentially about the intermediate portion 92. Gasket 116 preferably comprises an o-ring fitting snugly about connector body 80 at shoulder 114. The gasket 116 is preferably, although not necessarily, made of a compressible and resilient material, such as rubber or the like. The gasket 116 has an innermost margin 118, and is backstopped against the shoulder 114. It is foreseen that gasket 116 may be otherwise backstopped along connector body 80—for example via an adhesive and/or by being inset partly into a machined relief in an outer surface of connector body 80—without departing from the spirit of the present inventive concept.

The seal provided by the sealing interface 112 against the controller housing 24 restricts dust and/or moisture that may exist around the outside of the motor case 30 and/or controller housing 24 from seeping into the electronics compartment 52 through a plug port 120 (described in more detail below). The sealing out of dust and/or moisture from the electronics compartment 52 prevents damage to the electrical components in the controller housing 24 in dirty, moist and/or wet operating conditions. It is also foreseen that a shoulder and/or tapered intermediate portion of the connector body more generally may seal against the controller housing directly and/or without the need for a gasket and/or shoulder intermediary without departing from the spirit of the present invention.

Figure 7:
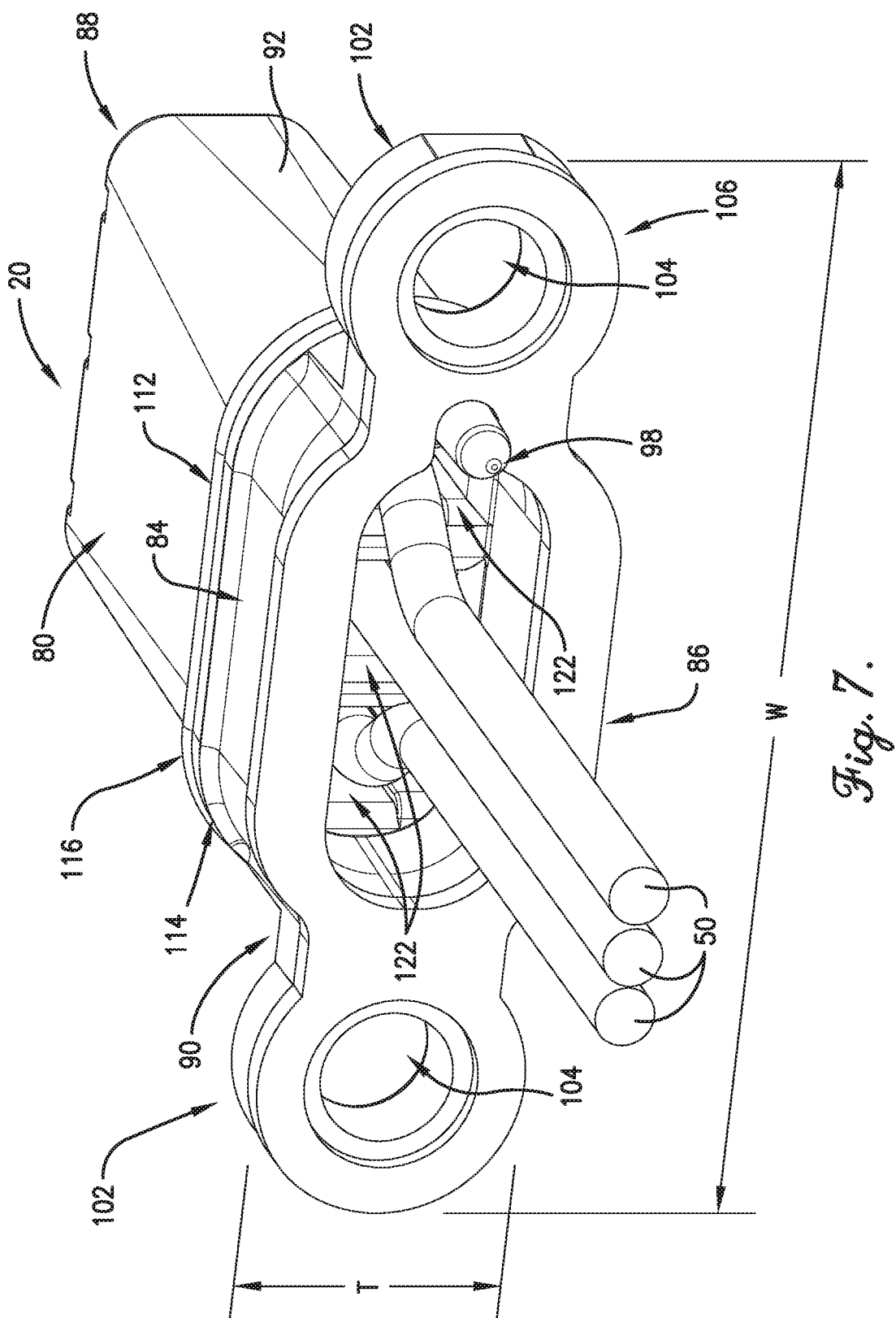
FIG. 7 is an enlarged isometric view of the lead connector of FIG. 4, showing an interface presented by a gasket for mounting against the flat face of the motor case as well as motor lead wires extending through mounting holes defined within an intermediate portion of the connector body.
Figure 8:
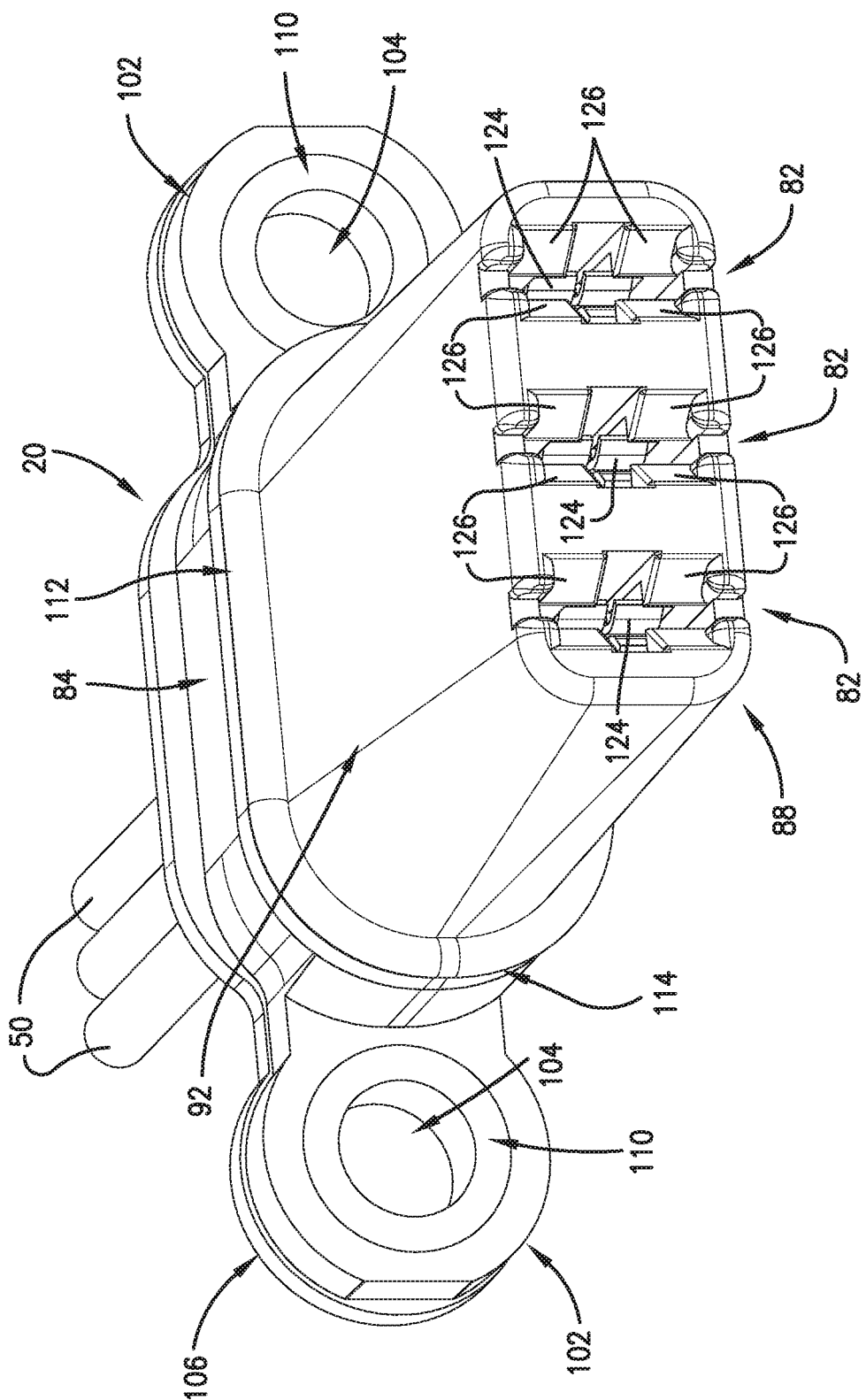
FIG. 8 is an enlarged isometric view of the lead connector of FIG. 4, similar in many respects to the view of FIG. 7, but being taken from an opposite vantage point proximate a terminal end of the lead connector that houses a plurality of terminal connecting assemblies.
Figure 10:
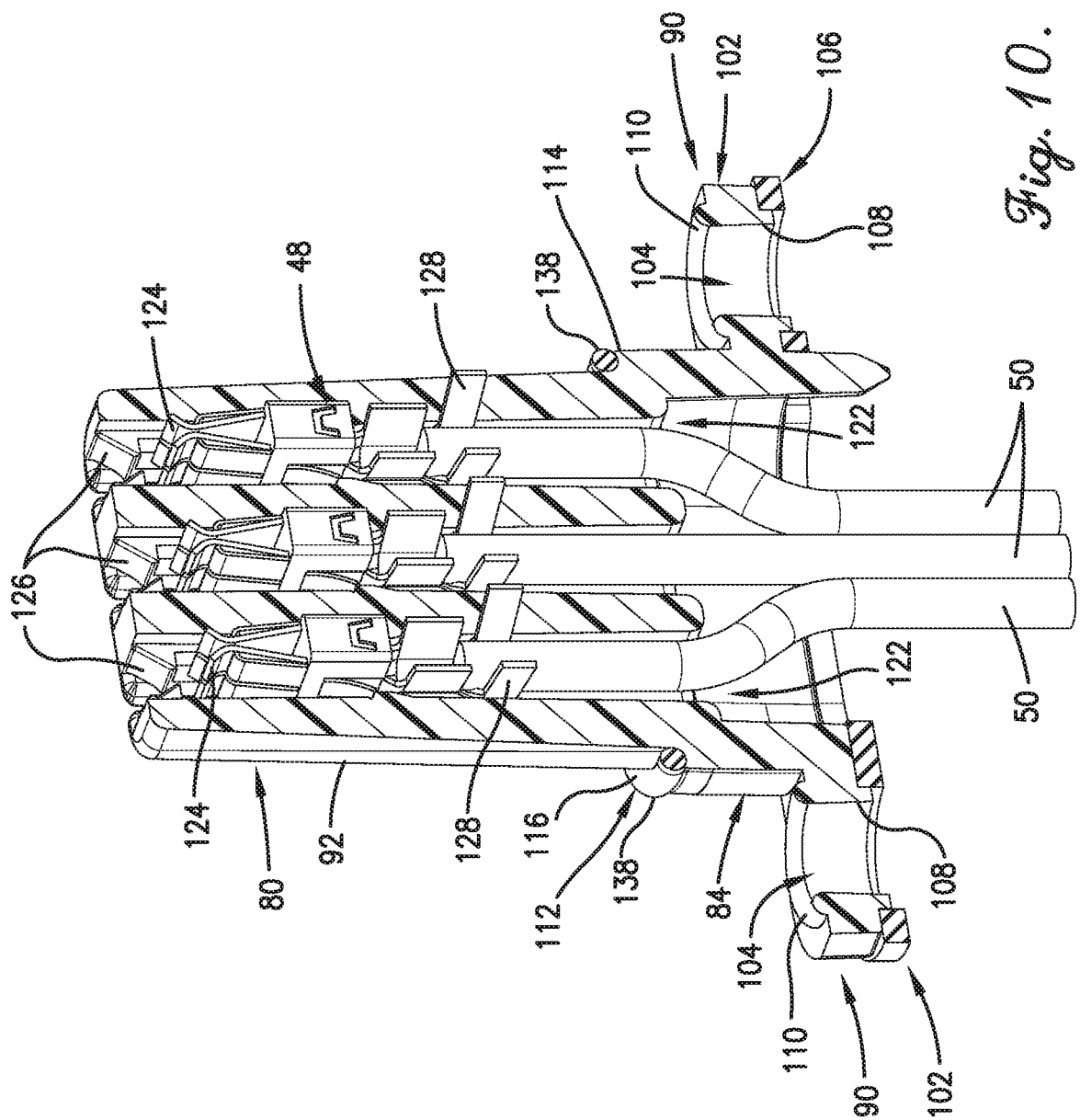
FIG. 10 is an enlarged sectional view of the lead connector of FIGS. 7-9.
Figure 11:
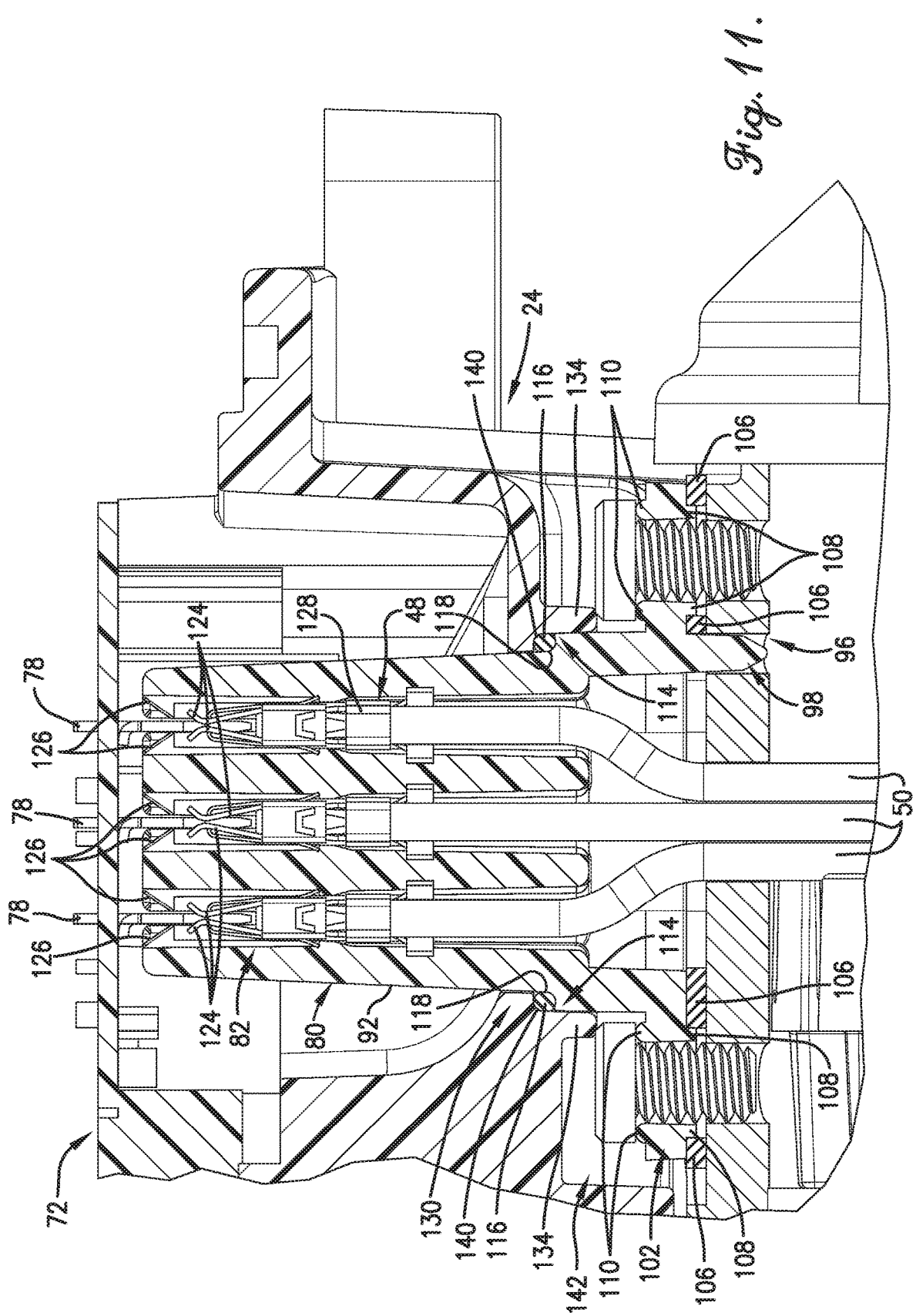
FIG. 11 is an enlarged, fragmentary, partial cutaway, sectional view of the motor of FIG. 1, similar in many respects to FIG. 9, but enlarged and taken from a rotated vantage point as well as converted to a line drawing.

Turning briefly to FIGS. 7 and 10, the base 84 and intermediate portion 92 also define therethrough a plurality of mounting holes 122 through which the wires 50 extend. Further, FIGS. 9-12 illustrate corresponding terminal connecting assemblies 82 of the lead connector 20. Each connecting assembly 82 broadly includes mounting wiper contacts 124. Each of the mounting wiper contacts 124 is secured within a respective mounting hole 122 and fixed relative to the connector body 80.

Each pair or set of mounting wiper contacts 124 is configured to be electrically connected to at least one of the prongs 78. The prongs 78 of circuit board 72 may be removably inserted between pairs of wiper contacts 124 for electrical connection with motor terminals 48 (see FIG. 9).

Angled socket entry surfaces 126 (see FIG. 10) preferably help funnel prongs 78 toward wiper contacts 124 during assembly.

Wires 50 may be connected to the connecting assemblies 82 at motor terminals 48 for electrical connection with mounting wiper contacts 124, such as by crimping, soldering, or the like. More particularly, wires 50 are fixed to connecting assemblies 82 at motor terminals 48 using gator clips and/or spade-style electrical connectors 128. Each of the terminal connecting assemblies 82 is configured to associate with and operably contact a respective wire 50 at an electrical connecter 128 when the lead connector 20 is properly installed over the opening 46.

Figure 12:
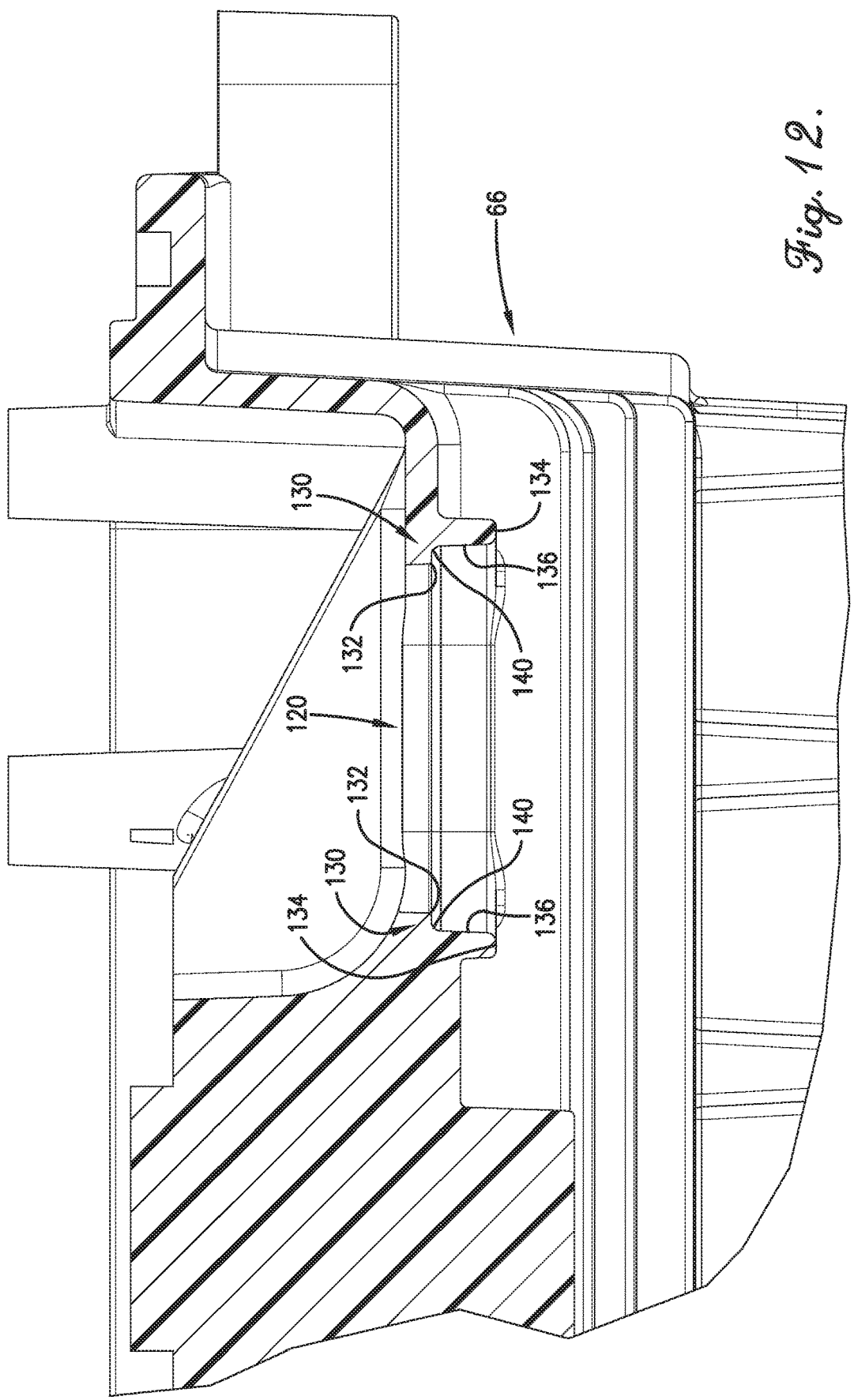
FIG. 12 is a fragmentary sectional view of a portion of the controller housing, wherein the housing has a bottom wall defining a plug port and surrounding shoulder structure.

Turning now to FIG. 12, the bottom wall 66 of controller housing 24 preferably defines plug port 120 for removably receiving lead connector 20. More particularly, a shoulder 130 of the bottom wall 66 extends around the periphery of and at least partly, and preferably fully, defines the plug port 120. The shoulder 130 presents a rim 132 dimensioned substantially the same as or slightly smaller than innermost margin 118 of o-ring gasket 116 when assembled against the shoulder 130 so that the gasket 116 forms a seal peripherally about the rim 132.

One of ordinary skill will appreciate that embodiments including a connector with a tapered intermediate portion—but not including a shoulder and/or o-ring gasket—may nonetheless define a plug port sized so that a controller housing seals more directly against the intermediate portion. More particularly, the controller housing may seal against the connector at a sealing interface comprising a correspondingly-sized segment of a tapered wall of the intermediate portion that forms a friction fit against a rim and/or other surface defining a plug port.

The shoulder 130 preferably includes a guide wall 134 substantially circumscribing rim 132 and having an inner surface 136. The guide wall 134 extends substantially orthogonal to a plane defined along a top (and/or bottom) surface of the board 72, and is dimensioned substantially the same as, or only slightly smaller than, an outermost margin 138 (see FIG. 10) presented by gasket 116 in an uncompressed (unassembled) condition. Extending between rim 132 and inner surface 136 of guide wall 134 is an arcuate surface 140 (see FIG. 12) for receiving gasket 116 in a substantially sealing relationship. Preferably, bottom wall 66 and motor case 30 also define between them an interstitial space 142 proximate each fastener 105 for reducing instances of interference between the various components proximate interface 86. (See FIG. 9)

The seal formed between shoulder 130 and gasket 116 provides several advantages. For instance, guide wall 134 not only provides an inner surface 136 for funneling or otherwise guiding lead connector 20 toward operative connection with prongs 78 and a seal with the controller housing 24, but also participates in forming that seal. That is, when properly assembled to the controller housing 24, outermost margin 138 of gasket 116 (see FIG. 10) is compressed inward to form an interference fit against guide wall 134 in addition to being sealed against the arcuate surface 140. Moreover, this sealing relationship provides relatively generous tolerance for misalignment and/or mismatching of dimensions between lead connector 20 and the structures of bottom wall 66 surrounding the plug port 120. More particularly, a seal may be partially or fully achieved between gasket 116 and guide wall 134 even in cases in which gasket 116 is not fully seated and flush against arcuate surface 140.

Along the base 84 of the connector 20, the interface 86 presented by the connector body 80 is generally aligned to overlie the opening 46 of the motor 22 during assembly (see FIG. 9). The lead connector 20 is associated with the opening 46 of the motor 22 and the terminal connecting assemblies 82 are associated with and electrically contact the respective wires 50 at motor terminals 48, as described above. Upon association and electrical connection between the respective terminal connecting assemblies 82, wires 50, and prongs 78, the motor controller may electrically communicate with and control and/or power the phase windings of stator assembly 28.

In this manner, the lead connector 20 provides an improved conduit for control and/or power supply from external sources that may, in a preferred embodiment, meet Ingress Protection Rating 54 (IP54) or greater rating(s) for dust and/or water resistance. The lead connector 20 may provide a more durable, yet preferably non-permanent, interface between motor 22 and such external sources, permitting quicker and easier controller change-out and/or interface repair at reduced cost. More specific aspects of the lead connector 20—such as its tapering intermediate portion 92 and second gasket 116 associated with shoulder 114—provide for easier and more forgiving alignment and completion of electrical contact between the controller and the motor terminals 48 while maintaining an adequate seal for the electronics compartment 52.

Further, the lead connector 20 preferably has a width W that is greater than a thickness T (see FIG. 7). In a preferred embodiment, the width W of lead connector 20, and the complementary dimensions of opening 46 and face 94, extend axially substantially parallel to cooling fins 42. This configuration preferably enhances cooling of motor 22 during operation by minimizing interference with flow through the axial channels 70 formed by fins 42 and fins 68.

A second preferred lead connector 200 is illustrated in FIGS. 13-15. The lead connector 200 includes a connector body 202 for at least partly housing four motor lead wires as described in more detail below. It is initially noted that, with certain exceptions to be discussed in detail below, many of the elements of the lead connector 200 of the second embodiment are the same as or very similar to those described in detail above in relation to the lead connector 20 of the first embodiment. Furthermore, with the exceptions to be discussed in more detail below, the lead connector 200 of the second preferred embodiment is suitable for use with associated devices otherwise configured like the motor 22, controller and controller housing 24.

Therefore, for the sake of brevity and clarity, redundant descriptions and numbering will be generally avoided here. Unless otherwise specified, the detailed descriptions of the elements presented above with respect to the first embodiment should therefore be understood to apply at least generally to the second embodiment, as well.

As illustrated in FIG. 15, connector body 202 includes a base 204 presenting an interface 206 that generally matingly corresponds with and overlies an opening of a motor (not shown). The connector body 202 generally tapers as it extends away from the base 204 and terminates in a terminal end 208. In more detail regarding the illustrated embodiment, the connector body 202 includes a flange 210 extending outwardly to form a skirt of the connector 200 substantially opposite the terminal end 208. Between the base 204 and the terminal end 208 is an intermediate portion 212 of the connector body 202.

The base 204 and intermediate portion 212 also define therethrough a plurality of mounting holes 214 through which wires 216 extend. With particular attention now to FIG. 13, the lead connector 200 further includes a plurality of terminal connecting assemblies 218. Each connecting assembly 218 broadly includes mounting wiper contacts 220. Upon assembly, each pair or set of mounting wiper contacts 220 is electrically connected to at least one prong (not shown) of a circuit board (also not shown), generally in the manner described above in connection with the first preferred embodiment.

In more detail with regard to the illustrated embodiment, each set of mounting wiper contacts 220 is fixed relative to the connector body 202. That is, each of the mounting wiper contacts 220 is secured within a respective mounting hole 214 of the connector body 202. Prongs of a circuit board may be removably inserted between pairs of wiper contacts 220 for electrical connection with motor terminals 224. Angled socket entry surfaces 222 preferably help funnel the prongs toward wiper contacts 220 during assembly.

Wires 216 may be connected to the connecting assemblies 218 at motor terminals 224 for electrical connection with mounting wiper contacts 220, such as by crimping, soldering, or the like. More particularly, wires 216 are fixed to connecting assemblies 218 at motor terminals 224 using gator clips and/or spade-style electrical connectors 226. Each of the terminal connecting assemblies 218 is configured to associate with and operably contact a respective wire 216 at an electrical connecter 310 when the lead connector 200 is properly installed over a power-supply opening of a motor (not shown).

The lead connector 200 is configured for at least partly housing four (4) wires 216. More particularly, the lead connector 200 defines four mounting holes 214 through which four wires 216 may respectively extend, and includes four motor terminals 224, four connecting assemblies 218, four pairs of wiper contacts 220 and four pairs of angled socket entry surfaces 222.

Preferably, the four wires 216 comprise three (3) phase winding wires and one (1) neutral wire. The neutral wire 216 is preferably grounded, for example via a connection to a motor grounding terminal (not shown). Advantageously, the lead connector 200 may improve operator safety through accommodating a neutral wire 216 according to the second preferred embodiment.

It should also be noted that a person of ordinary skill may adjust a controller and controller housing—for example by adding an additional prong to the controller board and redesigning the traces of the controller board—according to known, conventional practices for accommodating a neutral wire. Moreover, a person of ordinary skill may adjust a motor to incorporate a neutral wire—such as by connecting the neutral wire to a grounding terminal of the motor—according to known, conventional practices.

Although the above description presents features of preferred embodiments of the present invention, other preferred embodiments may also be created in keeping with the principles of the invention. Such other preferred embodiments may, for instance, be provided with features drawn from one or more of the embodiments described above. Yet further, such other preferred embodiments may include features from multiple embodiments described above, particularly where such features are compatible for use together despite having been presented independently as part of separate embodiments in the above description.

Those of ordinary skill in the art will appreciate that any suitable combination of the previously described embodiments may be made without departing from the spirit of the present invention.

The preferred forms of the invention described above are to be used as illustration only, and should not be utilized in a limiting sense in interpreting the scope of the present invention. Obvious modifications to the exemplary embodiments, as hereinabove set forth, could be readily made by those skilled in the art without departing from the spirit of the present invention.

The inventor hereby states his intent to rely on the Doctrine of Equivalents to determine and assess the reasonably fair scope of the present invention as pertains to any apparatus not materially departing from but outside the literal scope of the invention as set forth in the following claims.

What is claimed is:

1. An electric motor comprising:
    a rotor;
    a stator;
    a case at least partially enclosing the rotor and the stator; and
    a lead connector including—
        a body having a base, a terminal end, and an intermediate portion extending between the base and the terminal end;
        a first sealing interface extending substantially circumferentially about the intermediate portion;
        a second sealing interface abutting the case;
        a terminal connecting assembly comprising a wiper contact configured for providing electrical communication with a controller, the wiper contact extending further away from the base than at least a portion of the first sealing interface.

2. The electric motor of claim 1, further comprising a controller housing of the controller, the controller housing defining a plug port receiving the lead connector.

3. The electric motor of claim 2, wherein—
    the controller housing substantially encloses and defines an electronics compartment,
    the controller housing includes a shoulder extending around a periphery of, and at least partly defining, the plug port,
    the electric motor is assembled so that the shoulder seals against the first sealing interface to restrict ingress of contaminants into the electronics compartment.

4. The electric motor of claim 3, wherein the first sealing interface includes a gasket extending circumferentially about the intermediate portion.

5. The electric motor of claim 4, wherein the shoulder includes a rim circumscribing a bottom of the plug port, the gasket forming a seal peripherally about the rim.

6. The electric motor of claim 5, wherein—
    the lead connector further includes an arcuate surface circumscribing the rim and a guide wall circumscribing the arcuate surface, the guide wall extending away from the terminal end of the lead connector,
    the gasket seals against the controller housing along at least one of the arcuate surface and the guide wall.

7. The electric motor of claim 6, wherein the first sealing interface further includes a shoulder of the lead connector in a backstopping position relative to the gasket.

8. The electric motor of claim 6, wherein the guide wall includes an inner surface dimensioned slightly smaller than an outermost margin presented by the gasket, the gasket sealing along the inner surface.

9. The electric motor of claim 5, wherein the intermediate portion of the body of the lead connector tapers away from the base.

10. The electric motor of claim 5, wherein the second sealing interface includes a gasket disposed between the base of the lead connector and the case, the gasket being compressed by assembly of the lead connector to the case with a fastener.

11. The electric motor of claim 1, wherein the lead connector houses four (4) wires corresponding respectively to the terminal connecting assembly and three (3) additional terminal connecting assemblies for providing electrical communication with the controller housed in a controller housing.

12. A lead connector for an electric motor, the lead connector comprising:
 a body having a base, a terminal end, and an intermediate portion extending between the base and the terminal end;
 a first sealing interface extending substantially circumferentially about the intermediate portion;
 a gasket configured to form a second sealing interface between the base and the electric motor; and
 a terminal connecting assembly comprising a wiper contact configured for providing electrical communication with a controller, the wiper contact extending further away from the base than at least a portion of the first sealing interface.

13. The lead connector of claim 12, further comprising a pointed projection extending away from the base in a direction opposite the terminal end of the lead connector, the pointed projection being configured for alignment with and insertion into a corresponding alignment hole of a case of the electric motor.

14. The lead connector of claim 12, wherein the base includes a flange defining a fastener hole for securement of the lead connector to the electric motor, the gasket abutting a bottom of the flange and defining a hole therein corresponding to the fastener hole of the flange.

15. The lead connector of claim 14, wherein the flange includes a rib circumscribing the fastener hole along the bottom of the flange, the rib being inset at least partially through a thickness of the gasket to restrict extrusion of the gasket across the fastener hole.

16. The lead connector of claim 14, wherein the flange includes a ridge circumscribing the fastener hole along a top of the flange, the ridge being configured to seal against a bottom surface of a fastener inserted into the fastener hole.

17. A lead connector for an electric motor, the lead connector comprising:
 a body having a base, a terminal end, and an intermediate portion extending between the base and the terminal end, the intermediate portion tapering away from the base;
 a sealing interface extending substantially circumferentially about the intermediate portion; and
 a terminal connecting assembly comprising a wiper contact configured for providing electrical communication with a controller, the wiper contact extending further away from the base than at least a portion of the sealing interface,
 the base being configured for securement to the electric motor.

18. The lead connector of claim 17, wherein the sealing interface includes a shoulder extending circumferentially about the intermediate portion.

19. The lead connector of claim 17, wherein the sealing interface includes a gasket extending circumferentially about the intermediate portion.

20. The lead connector of claim 19, further comprising a shoulder in a backstopping position relative to the gasket.

* * * * *